United States Patent
Xu et al.

(10) Patent No.: US 8,600,185 B1
(45) Date of Patent: Dec. 3, 2013

(54) SYSTEMS AND METHODS FOR RESTORING COLOR AND NON-COLOR RELATED INTEGRITY IN AN IMAGE

(75) Inventors: Ning Xu, Irvine, CA (US); James E. Crenshaw, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/981,889

(22) PCT Filed: Jan. 30, 2012

(86) PCT No.: PCT/US2012/023181
§ 371 (c)(1),
(2), (4) Date: Jul. 25, 2013

(87) PCT Pub. No.: WO2012/106261
PCT Pub. Date: Aug. 9, 2012

Related U.S. Application Data

(60) Provisional application No. 61/438,219, filed on Jan. 31, 2011.

(51) Int. Cl.
*G06K 9/40* (2006.01)
*G06K 9/00* (2006.01)

(52) U.S. Cl.
USPC .......................... 382/254; 382/162

(58) Field of Classification Search
USPC .................................. 382/254, 162
See application file for complete search history.

(56) References Cited

U.S. PATENT DOCUMENTS

| | | |
|---|---|---|
| 6,198,552 B1 | 3/2001 | Nagae |
| 6,337,692 B1 | 1/2002 | Rai |
| 6,411,953 B1 | 6/2002 | Ganapathy |
| 6,707,931 B2 | 3/2004 | Herbert |
| 6,898,312 B2 | 5/2005 | Schroder |
| 7,057,765 B1 | 6/2006 | Fischer |
| 7,062,083 B2 | 6/2006 | Lim |
| 7,068,843 B2 | 6/2006 | Chang |
| 7,133,155 B2 | 11/2006 | Patton |
| 7,555,139 B2 * | 6/2009 | Rhoads et al. ............... 382/100 |
| 8,259,806 B2 | 9/2012 | Radhakrishnan |
| 2002/0051572 A1 | 5/2002 | Matsumoto |
| 2003/0164968 A1 | 9/2003 | Iida |
| 2008/0013836 A1 | 1/2008 | Nakamura |
| 2008/0104011 A1 | 5/2008 | Shibasaki |
| 2008/0144124 A1 | 6/2008 | Samadani |
| 2008/0239350 A1 | 10/2008 | Ohira |
| 2008/0252723 A1 | 10/2008 | Park |

(Continued)

FOREIGN PATENT DOCUMENTS

EP 1648158 4/2006

OTHER PUBLICATIONS

Bay, H. et al, "SURF: Speeded Up Robust Features," ECCV, pp. 404-417, 2008.

(Continued)

*Primary Examiner* — Bernard Krasnic

(57) ABSTRACT

Methods and systems for restoring image integrity in an image are described. The described methods and systems are particularly applied against an image after determining whether the image has undergone at least one of a color mutation, a non-color mutation, or a combination of a color mutation and a non-color mutation.

7 Claims, 6 Drawing Sheets

(56) References Cited

U.S. PATENT DOCUMENTS

| | | | |
|---|---|---|---|
| 2009/0016615 A1* | 1/2009 | Hull et al. | 382/217 |
| 2009/0041360 A1 | 2/2009 | Ohira | |
| 2009/0141986 A1 | 6/2009 | Boncyk | |
| 2009/0147141 A1 | 6/2009 | Lee | |
| 2009/0274369 A1 | 11/2009 | Sano | |
| 2010/0220913 A1* | 9/2010 | Slabaugh et al. | 382/131 |

OTHER PUBLICATIONS

Brown, M. et al, "Automatic Panoramic Image Stitching Using Invariant Features," IJCV, 2007.

Fischler, M. et al, "Random Sample Consensus: A Paradigm for Model Fitting with Applications to Image Analysis and Automated Cartography," CACM, Jun. 1981.

Jia, J. et al, "Bayesian Correction of Image Intensity With Spatial Consideration," vol. 3, pp. 342-354, 2004.

Jia, J. et al, "Tensor Voting for Image Correction by Global and Local Intensity Alignment," IEEE TPAMI, 2005.

Lowe, D. et al, "Distinctive Image Features from Scale-Invariant Keypoints," IJCV, Nov. 2004.

Mikolajczyk, K. et al, "A Comparison of Affine Region Detectors," IJCV, 2005.

Mikolajczyk, K. et al, "A Performance Evaluation of Local Descriptors", 2004.

Reinhard, E. et al, "Color Transfer Between Images", IEEE Computer Graphics and Applications, 2001.

Tai, Y. et al, "Local Color Transfer Via Probabilistic Segmentation by Expectation-Maximization", vol. 1, pp. 747-754, 2005.

Tang, F. et al, "A Novel Feature Descriptor Invariant to Complex Brightness Changes,", CVPR, 2009.

Torr, P. et al, "MLESAC: A New Robust Estimator with Application to Estimating Image Geometry," CVIU, 2000.

Wang, Z. et al, "Image Quality Assessment: From Error Visibility to Structural Similarity," IEEE Transactions on Image Processing, 2004.

Zhang, M. "Fast Color Correction Using Principal Regions Mapping in Different Color Spaces," 2004.

Mojsilovic, A. et al, "Extraction of Perceptually Important Colors and Similarity Measurement for Image Matching, Retrieval, and Analysis," IEEE Transactions on Image Processing, Nov. 2002.

Shao, F. et al, "Color Correction for Multi-view Based on Background Segmentation and Dominant Color Extraction," Nov. 2008.

R.W.G. Hunt, "Objectives in Colour Reproduction", J. Phot. Sci. 18, 205-215, 1970.

* cited by examiner

SYSTEMS AND METHODS FOR RESTORING COLOR AND NON-COLOR RELATED INTEGRITY IN AN IMAGE

CROSS-REFERENCE TO RELATED APPLICATIONS

This application is a 371 of PCT/US12/23181, filed on Jan. 30, 2012, which claims priority to U.S. Provisional Patent Application No. 61/438,219 filed 31 Jan. 2011, which is incorporated herein by reference in its entirety.

TECHNICAL FIELD

The present teachings relate to image processing. In particular, the present teachings relate to systems and methods for restoring integrity in an image that may have undergone color changes and/or non-color related changes.

BACKGROUND

The characteristics of an image may be subject to change as a result of various operations. Some of these operations may be initiated intentionally, such as, for example, a modification action carried out upon an image in order to impart certain desirable color characteristics to the image, while other operations may be non-color related operations that can unintentionally introduce undesirable distortions and color changes into the image.

A few examples of operations that are intentionally directed at modifying the color characteristics of an image include: changing the RGB ratio of a digital photograph based on a personal preference, changing the color intensity level in a projected color image so as to soften the colors for example, or changing a multicolored image into a sepia colored image. As can be understood, many of these modification actions are often based on individual preferences and perceptions, and are consequently, somewhat subjective in nature.

A few examples of non-color related operations that can undesirably modify the color characteristics of an image include: playing back a high-resolution movie in a video player having limited bandwidth capacity, propagating a video signal through a limited bandwidth transmission medium, using a codec having poor encoding/decoding characteristics, or carrying out illegal image transfer operations (such as making pirate copies of a movie).

While the non-color related operations described above are relatively easy to understand in terms of their impact upon an image, there are several other non-color related operations that cause a subtler and often overlooked impact on the characteristics of an image as well. A few examples of such operations include: cropping of an image, changing the aspect ratio of an image, and adding an object (such as a title) to an image.

These type of non-color related modification operations do not necessarily directly change the color characteristics of objects that existed in the image prior to the modification. However, the modification operations can lead to an overall change in image-related statistics. This change in image-related statistics may cause problems when image processing is subsequently carried out for purposes of rectifying color-related distortions in the image.

Thus, it is beneficial to consider color related operations, as well as non-color related operations, in a holistic manner for purposes of image processing.

DETAILED DESCRIPTION

Figure 1:
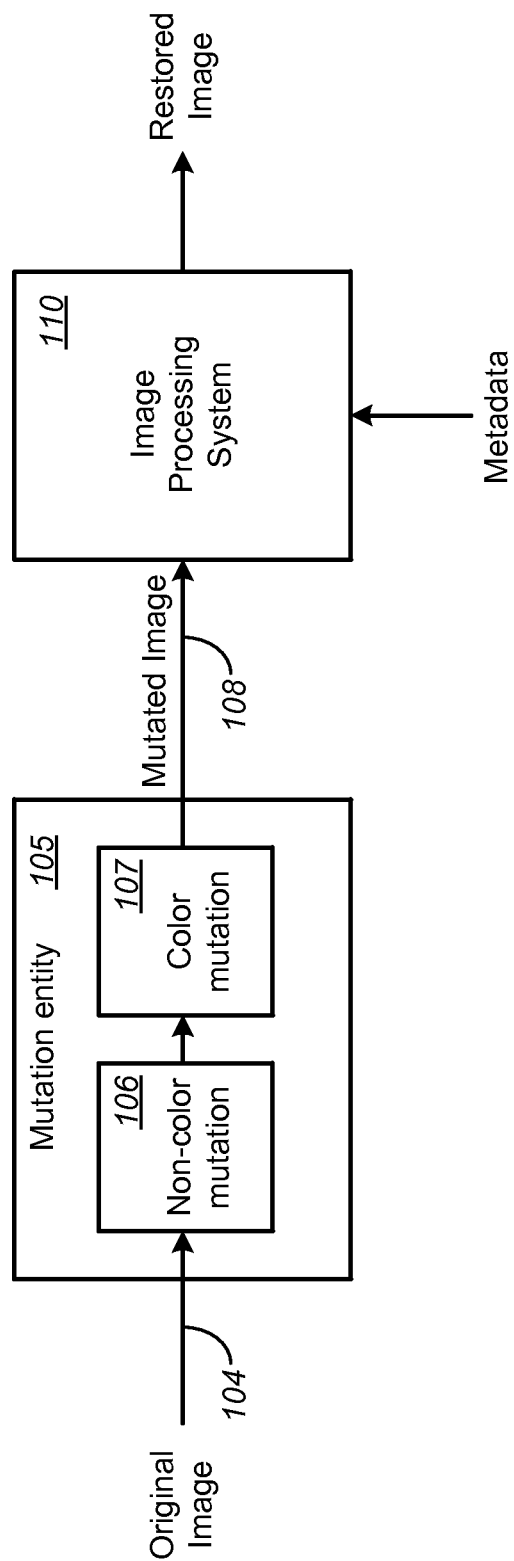
FIG. 1 shows an image processing system that is used for restoring color and/or non-color integrity in a mutated image.

According to a first aspect of the present disclosure, a method for restoring image integrity in an image is disclosed herein. The method includes the steps of determining if a first image is a mutated image by using metadata that provides invariant feature descriptors of a second image. If it is determined that the first image is a mutated image, generating a transform function based on at least one parameter that is estimated to contribute to a mismatch between the mutated image and the second image; and applying the transform function upon the mutated image for restoring image integrity.

According to a second aspect of the present disclosure, a system for restoring image integrity is disclosed herein. The system includes a first features extractor for extracting feature descriptors of a first image; at least one of: a) a second features extractor that operates on a second image for extracting metadata that provides feature descriptors of the second image, or b) a database containing feature descriptors of the second image; a feature matching sub-system for comparing the feature descriptors of the first image with the feature descriptors of the second image to determine if the first image is a mutated image; and a robust parameter estimator for receiving from the feature matching sub-system, a result of the comparing, and if determined that the first image is a mutated image, generate an estimated transform function for use in restoring image integrity in the mutated image.

According to a third aspect of the present disclosure, a method for restoring image integrity in at least one image amongst a set of images is disclosed herein. The method includes the steps of determining if a first image is a mutated version of an original image by using metadata that provides invariant feature descriptors of the original image; generating a transform function based on at least one parameter that is estimated to contribute to a mismatch between the original image and the mutated version of the original image; and applying the transform function upon at least one of: a) the mutated version of the original image, or b) a second image amongst the set of images.

According to a fourth aspect of the present disclosure, a codec system is disclosed herein. The codec system includes an encoder and a decoder, wherein the encoder includes a first features extractor for extracting feature descriptors in a first image; at least one of: a) a second features extractor that operates on an original image for extracting metadata that provides feature descriptors of the original image, or b) a database containing feature descriptors of the original image;

a feature matching sub-system for comparing the feature descriptors of the first image with the feature descriptors of the original image to determine if the first image is a mutated version of the original image; and a robust parameter estimator for receiving from the feature matching sub-system, a result of the comparing, and generate therefrom, an estimated transform function for use in restoring image integrity in the first image.

Prior art image processing solutions have generally sought to address color modification aspects and non-color-related modification aspects of images as two separate issues. The failure to recognize certain interdependencies between the two forms of image modification has thus led to sub-optimal image processing results.

For example, one prior art image processing solution uses a global color transfer method based on image statistics such as the mean and standard deviation of three individual color channels in a color space of an original image. While this strategy does provide certain benefits, there are at least three aspects that may require additional attention in order to obtain enhanced image processing results.

The first aspect pertains to a potential ambiguity in determining if a received image does indeed correspond correctly to a respective transmitted image. This issue becomes especially pertinent when a series of images is transmitted through a medium (for example, streaming video beamed via a satellite), which lends itself to the possibility that the image statistics corresponding to one image may be inappropriately applied against the wrong image.

The second aspect that bears further attention arises from the fact that a "good" image is often unavailable for reference purposes when carrying out color modification upon a corrupted image (after transmission from a satellite, for example). As a result, any changes carried out upon the corrupted image may be based on mean/standard deviation values that are open to various interpretations because absolute values from which the mean/standard deviation values have been derived are unavailable for reference. Thus for example, the original image may have a slightly red tint, while the color-corrected image may have a pink tint that is still deemed acceptable because this color variation falls within the provided mean/standard deviation values.

The third aspect comes into play when the color-corrupted image has undergone a non-color related distortion as well. As mentioned above, the non-color related distortion may lead to a modification of the image statistics, thereby rendering the received statistics ineffective, or misleading, for purposes of rectifying color corruption in the image.

At least one of the aspects described above is addressed, albeit somewhat sub-optimally, in a different prior art image processing solution. In this particular approach, a reference image is used for color correction purposes. Specifically, in what is referred to in the art as "panoramic stitching," a plurality of images that may include substantially similar portions of imaged objects (though with different color characteristics, such as arising from various camera settings, shooting angles, or lighting conditions) are processed for rectifying color-related problems. One amongst the plurality of images is deemed a reference image and the color characteristics of this reference image is used to modify the color characteristics of the other images. As can be understood, the selection of the reference image, as well as the modification of the remaining other images, is somewhat subjective in nature. Furthermore, the process necessitates that at least a "good" reference image be made available for carrying out the processing of the other images. This can pose a problem when the plurality of images (including the reference image) is transmitted from one location to another, thereby corrupting not only the other images but the reference image as well.

Proceeding now with a detailed description of various embodiments in accordance with the disclosure, it may be pertinent to point out that throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that terminology such as, for example, "changes," "mutation," "alteration," "correction," "modification," "extraction," "estimation," and "entity" are used herein as a matter of convenience for description purposes and should not be interpreted literally in a narrowing sense. For example, the term "mutation" may encompass a variety of actions such as for example: changing the size of the image, changing the shape of the image, alteration of an image by deleting certain objects, alteration of an image by introducing new objects, changing the color composition of an image, or changing the statistics of an image. A person of ordinary skill in the art will understand that terms such as mutation or alteration may be alternatively used in the art and must be interpreted in accordance with the context of the description herein. Furthermore, it should be understood that the term "image" as used herein encompasses a wide variety of elements such as for example, a digital image, a sequence of video images, a photographic image, a graphics image etc.

Specifically, this disclosure is directed at systems and methods of digital image processing for restoring integrity in an image that may or may not have been subjected to color and/or non-color mutation. As can be understood by one of ordinary skill in the art, the described digital image processing system and methods can be incorporated into a wide variety of devices. A non-comprehensive and non-limiting list of such devices includes: a communications system (containing a decoder/encoder, for example), a display device (monitor, personal digital assistant (PDA), smartphone etc that displays color images), a printing device, a scanning device, and an image capture device (camera etc).

Attention is now drawn to FIG. 1, which shows an image processing system 110 that is used for restoring image integrity in an image that may or may not have been subjected to color and/or non-color mutation. The phrase "original image" as used herein, encompasses several different types of images including color images and/or black-and-white images. Furthermore, the phrase "original image" as used herein, encompasses images in a variety of formats including a compressed format and an uncompressed format. In certain embodiments, image processing system 110 will retain the original format and merely rectify the color-related and/or non-color related mutations that the original image has undergone as a result of mutation entity 105. Thus, an original image that is in a compressed format, may be processed by image processing system 110 and the resulting restored image is made available from image processing system 110 in the same compressed format as the original image. In other embodiments, an original image having a first compression format may be processed by image processing system 110 in such a manner that the restored image is output in a different compressed format, or in an uncompressed format.

The mutation in mutation entity 105 may take the form of a non-color mutation 106, a color mutation 107, or a combination of both mutations. Mutation entity 105 represents any device, element or process that introduces mutation in an image. A non-exhaustive list of mutation entities includes devices (scanners, printers, cameras, communication equipment etc.); transmission media (cable, wireless etc); and processes (film processing, image enhancement etc.).

In general, non-color mutation 106 embodies actions such as: cropping, changing the aspect ratio, adding an object (a title, or a backdrop item, for example), rotation, translation, scaling, changing frame repetition rate, removing artifacts (removing motion blur, aberrations etc), and changing luminance parameters; while color mutation 107 embodies actions such as: changing the red-green-blue (RGB) profile, changing image resolution, and changing chrominance parameters (replacing one color with another, for example).

Furthermore, though non-color mutation 106 and color mutation 107 are shown in FIG. 1 as sequential action blocks, it will be understood that in some scenarios only one of the two actions may have been imposed upon the original image; in some other scenarios both actions may have been imposed upon the original image; and in yet other scenarios neither action may have been imposed upon the original image. Consequently, image processing system 110 generally operates under the assumption that an image that is received via line 108 (labeled "mutated image" for purposes of convenience) is one of: a) an original image that has undergone only a non-color mutation, b) an original image that has undergone only a color mutation, c) an original image that has undergone both a non-color mutation and a color mutation, or d) an original image that has not undergone any form of mutation. Image processing system 110 further operates under the assumption that the identity of the image that is received via line 108 is unknown. In other words, image processing system 110 does not presume that the image that is received via line 108 automatically has a one-to-one correspondence with any image-related information (metadata) that is obtained in image processing system 110 for purposes of restoring image integrity in the mutated image. This latter aspect is described below in further detail using FIG. 2.

Persons of skill in the art will recognize that, in contrast to the description above, prior art image processing systems generally fail to make such a multiple-choice presumption when processing an image.

Figure 2:
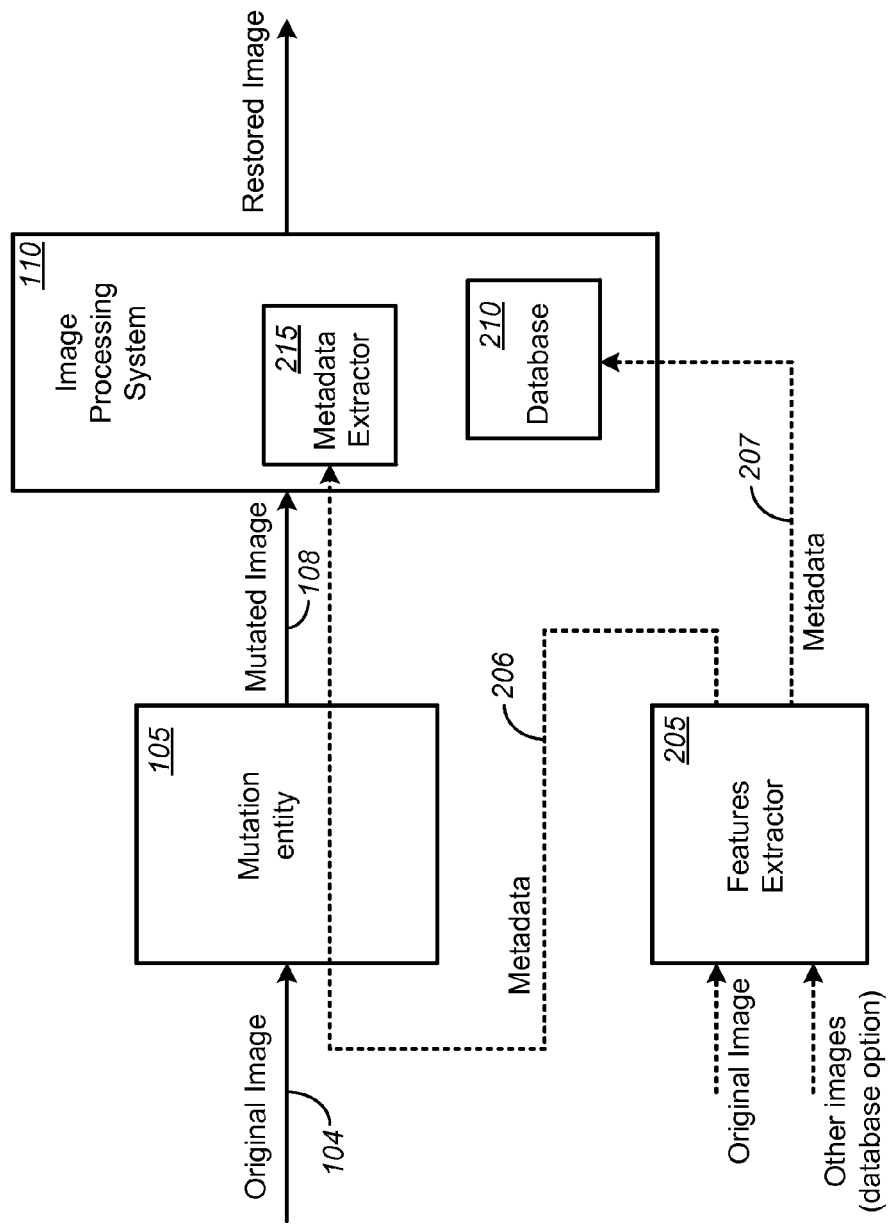
FIG. 2 shows a few components of the image processing system shown in FIG. 1.

FIG. 2 shows additional details pertaining to image processing system 110. Features extractor 205 is used to extract certain features from one or more images and convert these extracted features into metadata that is provided to image processing system 110 (in at least two alternative ways). In a first embodiment, the metadata (shown coming out of features extractor 205 via line 206) is combined with the original image (line 104) and the combination of the mutated image and the metadata is provided to image processing system 110, wherein the metadata is extracted by metadata extractor 215 and used for processing the mutated image.

In a second embodiment, the metadata (shown coming out of features extractor 205 via line 207) is provided to a database 210 that is a part of image processing system 110. Database 210 is accessed by a processor (not shown) of image processing system 110 and appropriate metadata is retrieved for purposes of processing the mutated image received via line 108. The metadata transfer from features extractor 205 to database 210 can take place in real-time (substantially coincident with receiving the mutated image on line 108), or can be done prior to providing the mutated image to image processing system 110. Furthermore, database 210 is configured to contain either: 1) only metadata corresponding to the original image on line 104, or 2) metadata corresponding to not only the original image on line 104 but other images as well that may or may not be provided on line 104.

It will be understood that features extractor 205 is shown external to image processing system 110 solely for purposes of convenience in description. However, features extractor 205 can be included as one of the components of image processing system 110 in one implementation. In alternative implementations, features extractor 205 can be eliminated (or replaced by other elements) and the metadata stored in database 210 can be generated in other ways. For example, in one alternative implementation, the metadata can be generated on the basis of theoretical parameters, empirical parameters, and/or predicted parameters.

A few examples of the types of metadata that can be used in image processing system 110 include: image statistics of the original image (mean, median, standard deviation, Gaussian parameters etc), color data (pixel values, chrominance information, spectral content, colorimetric parameters etc), shape data, distinguishing characteristics of certain segments of the original image, definitions of one or more objects in the original image, added objects (for example, markings such as fiducials, margins, arrows etc that provide dimension, alignment, and orientation information), spatial overlap information between images, etc.

Figure 3:
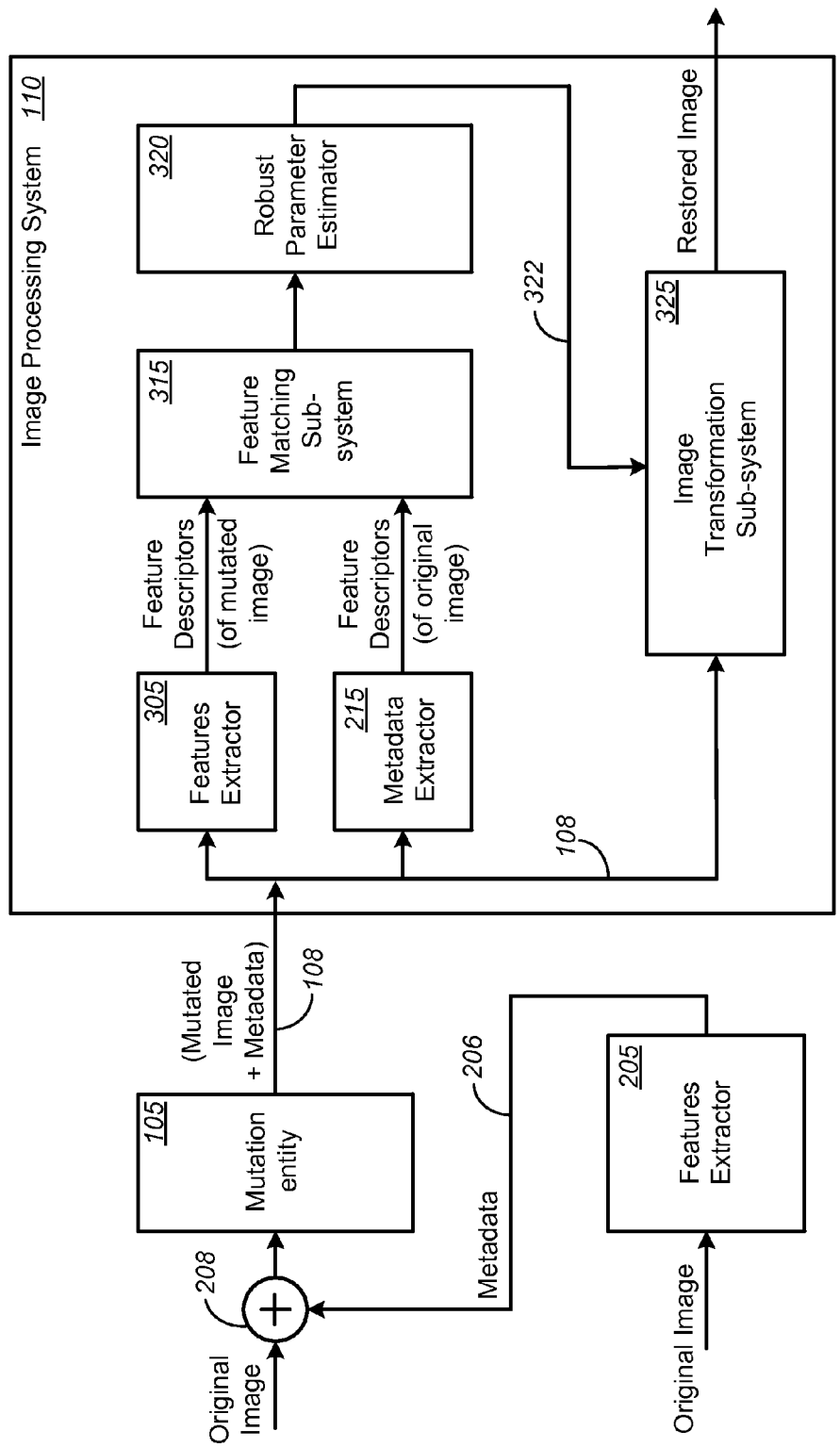
FIG. 3 shows a first embodiment of an image processing system in accordance with the teachings of the present disclosure.

Attention is now drawn to FIG. 3, which shows further details of an image processing system 110 in accordance with the first embodiment referred to above. The original image is combined with the metadata carried on line 206, via a combiner 208. The combined signal is then transmitted towards image processing system 110. As explained above, mutation entity 105 may introduce non-color mutation and/or color mutation into the original image portion of the combined signal.

The metadata is typically unaffected by mutation entity 105. For example, a non-color mutation, such as a cropping of the original image, may change the image data both in terms of the image itself and also in terms of the image statistics of the cropped image. However, the metadata that is carried along with the image remains unaffected, and it is this unaffected, original metadata that is used in image processing system 110, rather than any new image information that may correspond to the cropped (mutated) image. (In contrast, it may be noted that several prior art solutions primarily use the mutated image information for color correction purposes, rather than using information pertaining to the original (unmutated) image, which is unavailable at the receiving end.). Typically, the size of the metadata used in this first embodiment, equals the product of the number of feature points (n), the size of the descriptors (k) and the number of color channels (3, when red-green-blue (RGB) is used).

Image processing system 110 includes metadata extractor 215 that operates upon the metadata received along with mutated image and generates one or more feature descriptors of the original image. Features extractor 305 operates upon the received mutated image and generates one or more feature descriptors of the mutated image. The feature descriptors of both the original image and the mutated image are sometimes referred to in the art, as "robust features." The robust features are selected to correspond to invariant features in the original image. In certain cases, a robust feature is determined on the basis of a pixel value in conjunction with pixel values of neighboring pixels in the original image.

Feature matching sub-system 315 receives the feature descriptors of the original image and the feature descriptors of the mutated image and carries out a matching operation to determine if at least some features of the mutated image matches that of the original image. This matching process ensures that image processing operations are carried out upon the correct image (i.e. by verifying that the mutated image correctly corresponds to the original image and the associated metadata), thus addressing and overcoming certain prior art issues wherein data from one image may be used erroneously to process a different image.

Feature matching sub-system 315 may be configured to operate in several different ways. In a first approach, feature matching sub-system 315 performs a one-to-one matching operation upon a subset of features. In another approach, feature matching sub-system 315 performs a matching operation upon one or more image segments. Furthermore, feature matching sub-system 315 may carry out feature matching based on various descriptors that characterize local regions in the images, and may further use procedures such as Scale Invariant Feature Transform (SIFT), Gradient Location and Orientation Histogram (GLOH), Speeded Up Robust Features (SURF), and Ordinal Spatial Intensity Distribution (OSID), for example.

Irrespective of the type of matching procedures used, in this first embodiment of image processing system 110, the output of feature matching sub-system 315 provides information indicating whether or not the mutated image corresponds to the original image. If the mutated image corresponds to the original image, the extent of the match between the two images is indicated. In one implementation, this indication takes the form of a number of outliers that are produced as a result of matching errors. Consequently, the output of feature matching sub-system 315 comprises a matching result that may include positive matches, negative matches, and/or outliers (which may or may not indicate mismatches).

Robust parameter estimator 320 incorporates one or more parametric models for modeling the image distortion (color related and/or non-color related distortion) and to estimate model parameters based on the matching results provided to robust parameter estimator 320 by feature matching sub-system 315. Since outliers may be present in the matching result, the estimation process used by robust parameter estimator 320 may include a robust regression algorithm, which is described below in more detail using FIG. 6. The output of robust parameter estimator 320 is an estimated transform function (an estimated color transform function, a non-color transform function, or a combination of both) that is fed into image transformation sub-system 325 via line 322. Image transformation sub-system 325 applies the estimated transform function to the mutated image (carried on line 108) and generates a restored image. The image transformation can be carried out by applying the estimated transform function directly to each pixel of the mutated image for purposes of producing the restored image.

In a first embodiment, the image transformation involves restoring color depth in the mutated image by using a bit-based approach. In this approach, features extractor 205 extracts invariant features, such as descriptors and colors, based on a first bit depth. Features extractor 305 extracts invariant features from the mutated image by using a different bit depth. However, in certain cases, features extractor 305 may extract invariant features from the mutated image by using the same first bit depth as used by features extractor 205. After feature matching is carried out in feature matching sub-system 315 based on the extracted descriptors, robust parameter estimator 320 outputs an estimated color transform function containing one or more parameters. These parameters may be based on a color distortion model 600 that is described below in further detail. Robust parameter estimator 320 repeatedly estimates the one or more parameters to derive the estimated color transform function based on colors of various subsets that have a maximum number of supporting features. The estimated color transform function is provided via line 322 to image transformation sub-system 325.

In a second embodiment, the image transformation involves restoring image geometry to a color and/or a black-and-white mutated image. In this approach, features extractor 205 extracts invariant features such as descriptors and also extracts one or more coordinates associated with an image. Features extractor 305 extracts invariant features and one or more coordinates from the mutated image. After feature matching is carried out in feature matching sub-system 315 based on the extracted descriptors, robust parameter estimator 320 outputs an estimated transform function that includes geometric values. This estimated transform function may contain one or more parameters in a mathematical format. One example of such a format is as follows:

$$x2 = a1*x1 + b1*x1*x1 + c1*y1 + d1*y1*y1 + e1*x1*y1 + f1;$$

$$y2 = a2*x1 + b2*x1*x1 + c2*y1 + d2*y1*y1 + e2*x1*y1 + f2;$$

Robust parameter estimator 320 repeatedly estimates the one or more parameters to derive the estimated transform function based on coordinates of various subsets that have a maximum number of supporting features. The estimated transform function is provided via line 322 to image transformation sub-system 325.

Figure 4:
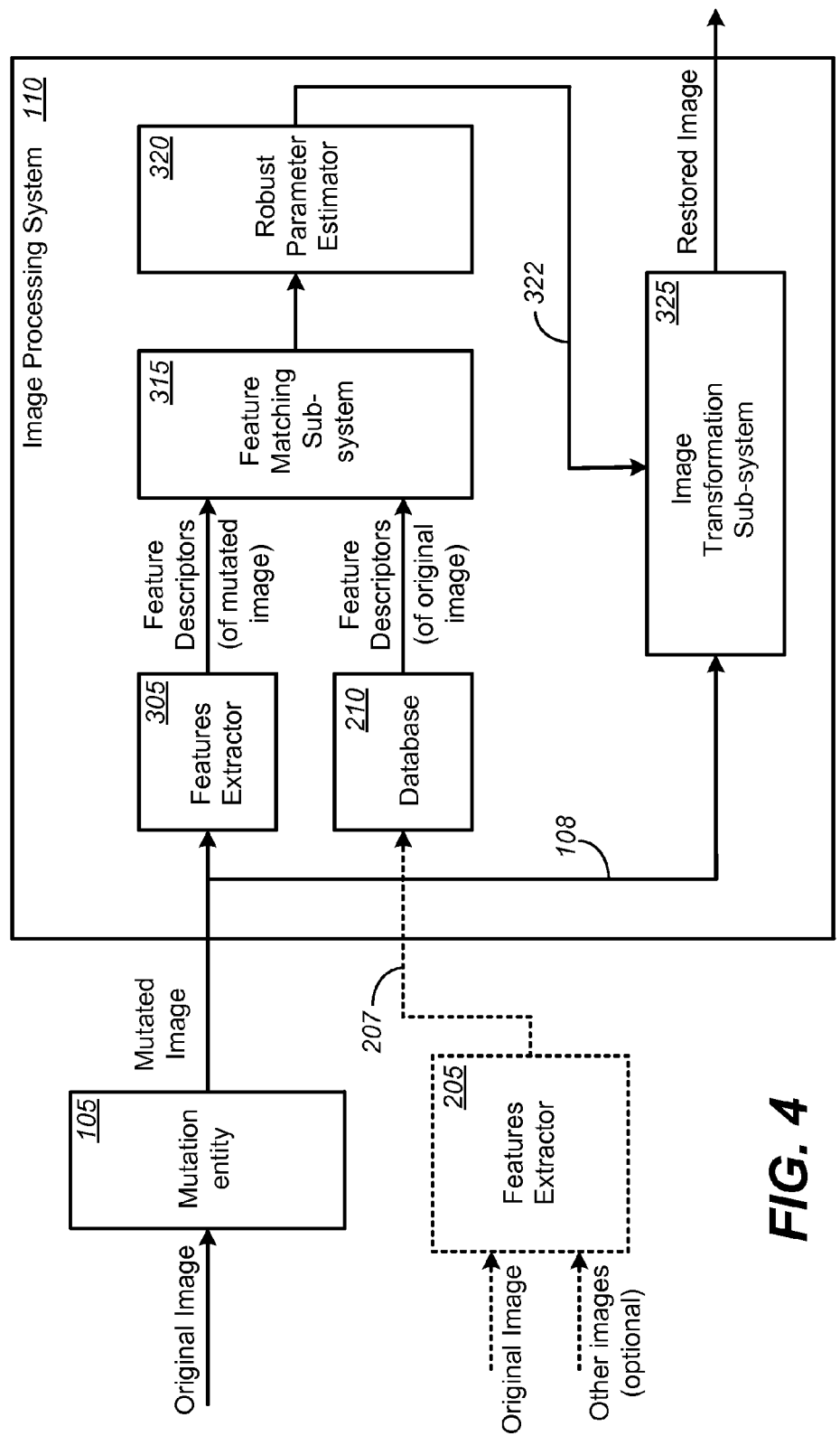
FIG. 4 shows a second embodiment of an image processing system in accordance with the teachings of the present disclosure.

Attention is now drawn to FIG. 4, which shows a second embodiment of an image processing system 110 in accordance with the teachings of the present disclosure. In contrast to the embodiment shown in FIG. 3, this second embodiment does not incorporate the transfer of metadata along with the original image. Instead, a database 210 is used to store feature descriptors of the original image (and any additional images, if so desired). These stored feature descriptors are used by feature matching sub-system 315 for matching against feature descriptors extracted from the mutated image (via features extractor 305, as described above with reference to FIG. 3). Features extractor 205 is shown in dotted lines to indicate that this block can be included inside the image processing 110 in one embodiment, and may be excluded in a different embodiment (for example, when the feature descriptors of database 210 are derived from equations, empirical data, or image models).

Database 210 can be configured in some cases to contain feature descriptors and color-related information of various video images. The feature descriptors may be made accessible using name indexing for example. In certain implementations where the mutated image coming in on line 108 is a sequence of color video images, and it is desired that all images in the sequence undergo the same color transformation, database 210 can be configured to contain feature descriptors of only the first image in the sequence. These feature descriptors can be used for color transforming one or more images in the sequence. The feature descriptors can also be used for non-color related transforming of several or all images in the sequence. In certain other implementations where the mutated image coming in on line 108 is a sequence of black-and-white video images, and it is desired that all images in the sequence undergo the same transformation, database 210 can be configured to contain feature descriptors of only the first image in the sequence. These feature descriptors can be used for transforming one or more images in the sequence.

Figure 5:
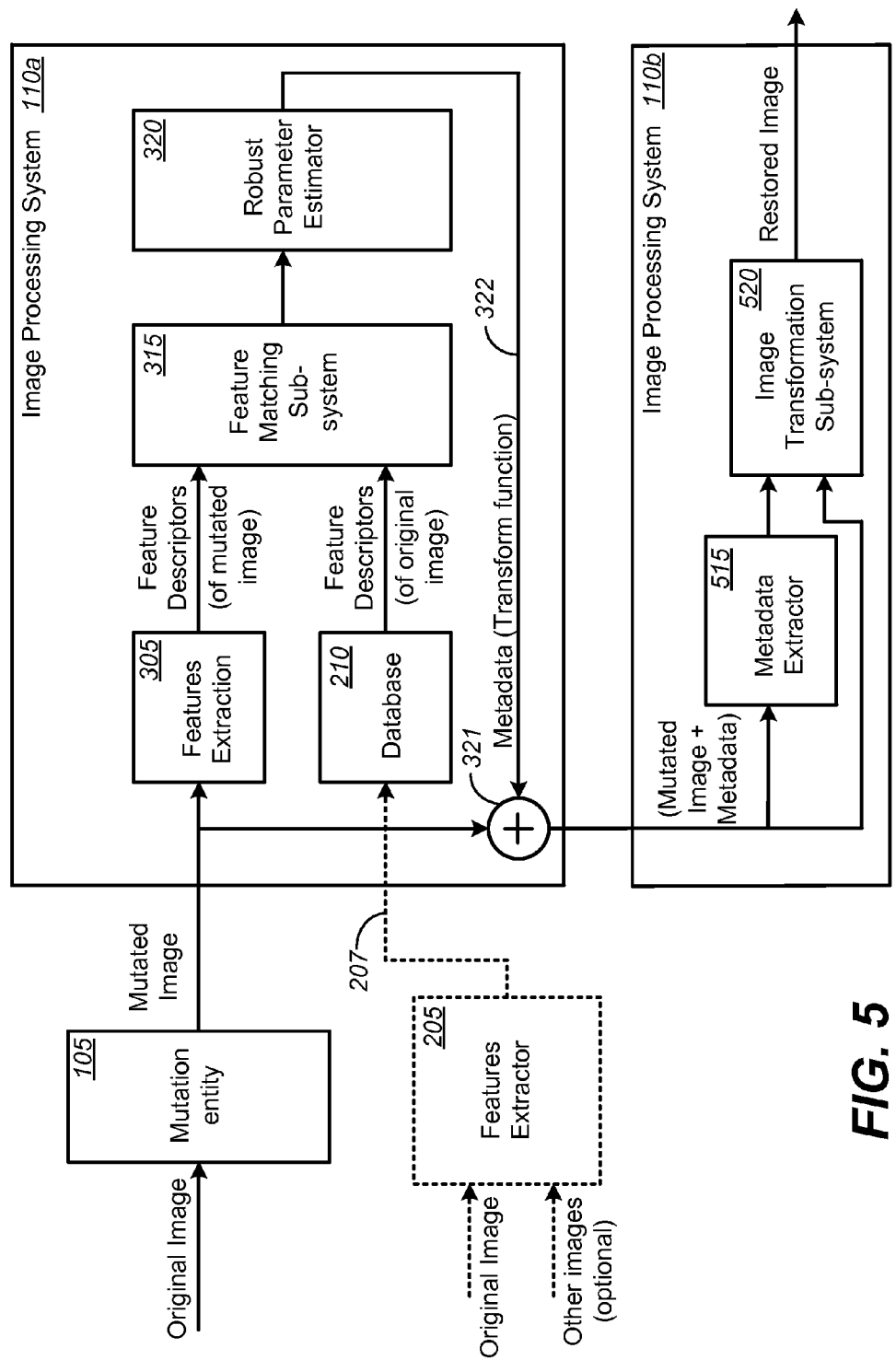
FIG. 5 shows a third embodiment of an image processing system in accordance with the teachings of the present disclosure.

FIG. 5 shows a third embodiment of an image processing system 110 in accordance with the teachings of the present disclosure. In this embodiment, the image processing system 110 has a distributed architecture that is located in two different devices. As shown in the example configuration of FIG.

5, the first device is an encoder housing a first portion of image processing system 110 (labeled image processing system 110a), while the second device is a decoder housing a second portion (labeled image processing system 110b).

When implemented in a distributed architectural form, image information can be transported in a variety of ways, and various system elements may be used. In the example configuration shown, several components of image processing system 110a are similar to those described using FIG. 4. However, robust parameter estimator 320 is implemented in a different manner in this particular embodiment. Specifically, robust parameter estimator 320 uses a video indexing approach for example, to generate a transform function and additional image parameters. The transform function (and/or additional image parameters) is treated as metadata that is combined with the mutated image in combiner 321. The mutated image along with the metadata is then propagated to the decoder where image processing system 110b is used to restore image integrity in the mutated image. The size of the metadata in this implementation is directly proportional to the size of the image parameters. In one example implementation using a color transform model that is described below in more detail, the size of the metadata equals three sets of seven parameters.

Image processing system 110b includes a metadata extractor 515 that extracts the transform function from the combination of the mutated image and the metadata (received from combiner 321). Image transformation sub-system 520 applies the extracted transform function to the mutated image and generates a restored image. As pointed out above, the mutated image can be either a color image or a black-and-white image, and the transform function can be one of a color transform function, a non-color transform function, or a combination of both.

Figure 6:
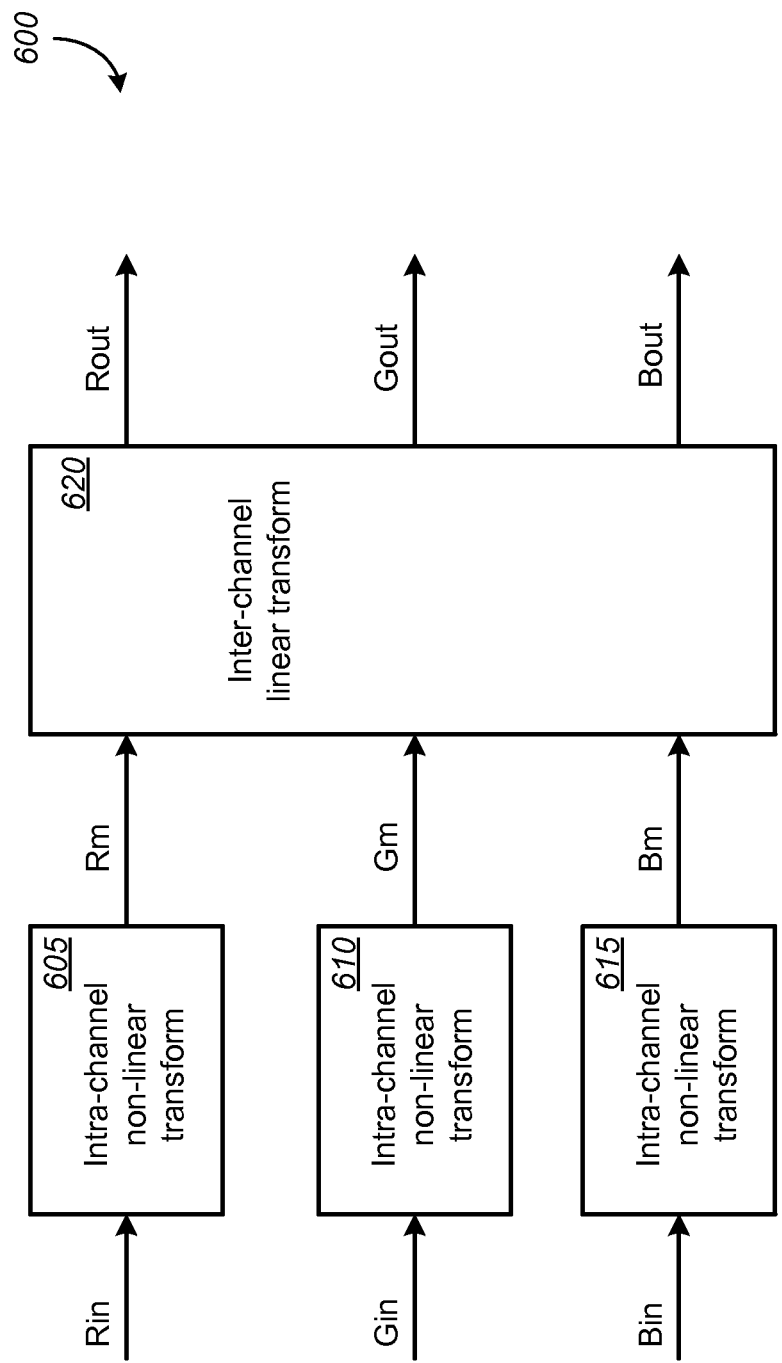
FIG. 6 shows some details of a color distortion model that is used in an image processing system in accordance with the teachings of the present disclosure.

FIG. 6 shows some details of a color distortion model 600 that is used in an image processing system in accordance with the teachings of the present disclosure. Color distortion model 600 includes two transform stages. The first stage has three intra-channel non-linear transforms 605, 610 and 615 each corresponding to one of 3 colors (red, green and blue), while the second stage has an inter-channel linear transform s 620. The intra-channel non-linear transforms are approximated using polynomials arranged in a quadratic format as follows:

$$R_m = a_r R_{in}^2 + b_r R_{in} + c_r$$

$$G_m = a_g G_{in}^2 + b_g G_{in} + c_g$$

$$B_m = a_b B_{in}^2 + b_b B_{in} + c_b$$

The inter-channel transform is assumed to be a linear transform within the color space, and thus has the form:

$$\begin{bmatrix} R_{out} \\ G_{out} \\ B_{out} \end{bmatrix} = M \cdot \begin{bmatrix} R_m \\ G_m \\ B_m \end{bmatrix} = \begin{bmatrix} m_{11} & m_{12} & m_{13} \\ m_{21} & m_{22} & m_{23} \\ m_{31} & m_{32} & m_{33} \end{bmatrix} \cdot \begin{bmatrix} R_m \\ G_m \\ B_m \end{bmatrix}$$

The intra-channel and inter-channel transforms are combined as follows:

$$R_{out} = r_1 R_{in}^2 + r_2 R_{in} + r_3 G_{in}^2 + r_4 G_{in} + r_5 B_{in}^2 + r_6 B_{in} + r_7$$

$$G_{out} = g_1 R_{in}^2 + g_2 R_{in} + g_3 G_{in}^2 + g_4 G_{in} + g_5 B_{in}^2 + g_6 B_{in} + g_7$$

$$B_{out} = b_1 R_{in}^2 + b_2 R_{in} + b_3 G_{in}^2 + b_4 G_{in} + b_5 B_{in}^2 + b_6 B_{in} + b_7$$

Estimating of the parameters $r_i$, $g_i$, and $b_i$, (i=1, 2, ... 7) from the colors of the matched feature points (output from features matching sub-system 315) is carried out in robust parameter estimator 320 using various regression methods. For example, in one implementation, a robust regression method using a Random Sample Consensus (RANSAC) algorithm may be used. In other implementations, variations of the RANSAC algorithm, such as Maximum Likelihood Estimation Sample Consensus (MLESAC) may be used.

In summary, according to several embodiments, the present disclosure considers systems and methods for restoring image integrity in an image. These systems and methods can be incorporated into various applications such as stand-alone devices (e.g. a Blu-ray video player), set-top boxes, software encoders, and video game machines; as well as networked devices (including devices coupled to bandwidth constrained communication links). Additional applications include BD video encoders, players, and videodiscs created in the appropriate format, or content and systems targeted for applications such as broadcast, satellite, and IPTV systems.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a microprocessor, a microcontroller, a digital signal processor (DSP), an application specific integrated circuit (ASIC), a standard logic integrated circuit, or a field programmable logic array (PLD, FPGA etc.)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the enhancement methods for sampled and multiplexed image and video data of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method for restoring image integrity, the method comprising:

extracting invariant feature descriptors from an original image;

combining the invariant feature descriptors as metadata with the original image;

transmitting the invariant feature descriptors as metadata along with the original image through a mutation entity towards an image processing system;

the invariant feature descriptors being unaffected by the mutation entity;

the original image being mutated by the mutation entity to a mutated image;

the mutation of the original image to the mutated image being a result of a combination of a non-color mutation and a color mutation introduced by the mutation entity;

receiving the invariant feature descriptors as metadata along with the mutated image at the image processing system;

extracting the metadata from the combination to generate invariant feature descriptors of the original image;

generating feature descriptors of the mutated image;

the feature descriptors of the mutated image being robust features which correspond to the invariant feature descriptors of the original image;

determining if the original image has been mutated by the mutation entity to the mutated image by using the invariant feature descriptors of the original image and the feature descriptors of the mutated image;

if determined that the original image has been mutated by the mutation entity to the mutated image, generating a transform function by estimating at least one parameter which contributes to the mutation of the original image to the mutated image and by using a regression algorithm; and applying the transform function upon the mutated image for restoring image integrity by rectifying the mutations that the original image has undergone as a result of the mutation entity;

the transform function including a color transform function comprising an intra-channel nonlinear color mapping transform and an inter-channel linear transform.

2. The method of claim 1, wherein the original image is at least one of a color image or a black-and-white image, and wherein at least a portion of image content in the mutated image is substantially the same as in the original image.

3. The method of claim 1, wherein the original image is a color image, and restoring image integrity comprises restoring color integrity in the color image.

4. The method of claim 1, wherein the non-color mutation comprises at least one of: a scaling of the original image, an aspect ratio change of the original image, a modification of an object contained in the original image, or an addition of an object into the original image.

5. The method of claim 1, wherein the step of determining if the original image has been mutated by the mutation entity to the mutated image is performed with no prior knowledge of the at least one parameter which contributes to the mutation of the original image to the mutated image.

6. The method of claim 1, wherein the invariant feature descriptors comprise spectral data and shape data of the mutated image.

7. A non-transitory computer-readable medium having stored thereon computer-executable instructions for executing a method in accordance with claim 1.

* * * * *